United States Patent [19]
Watanabe

[11] Patent Number: 5,502,810
[45] Date of Patent: Mar. 26, 1996

[54] OPTICAL TRANSMISSION SYSTEM

[75] Inventor: Seiji Watanabe, Tokyo, Japan

[73] Assignee: NEC Corporation, Tokyo, Japan

[21] Appl. No.: 20,372

[22] Filed: Feb. 22, 1993

[30] Foreign Application Priority Data

Feb. 20, 1992 [JP] Japan ................................ 4-070238

[51] Int. Cl.⁶ .................................................. H04B 10/16
[52] U.S. Cl. .................................................. 359/177
[58] Field of Search .................................... 359/174–179, 359/173, 180–181

[56] References Cited

U.S. PATENT DOCUMENTS

| | | | |
|---|---|---|---|
| 5,023,948 | 6/1991 | Smith | 359/180 |
| 5,162,936 | 11/1992 | Taga | 359/177 |
| 5,390,185 | 2/1995 | Hooijmans | 359/124 |

FOREIGN PATENT DOCUMENTS

| | | | |
|---|---|---|---|
| 0084034 | 5/1985 | Japan | 359/110 |
| 0119328 | 5/1990 | Japan | 359/177 |
| 0252230 | 11/1991 | Japan | 359/177 |
| 0252232 | 11/1991 | Japan | 359/177 |
| 3272229 | 12/1991 | Japan | 359/194 |

OTHER PUBLICATIONS

S. Saito et al, "An Over 220–km Coherent Transmission Experiment at 2.5 Gb/s Using Erbium–Doped–Fiber In–Line Amplifiers", Journal of Lightwave Technology, vol. 9, No. 2, Feb. 1991, pp. 161–169.

S. Ryu et al, "Long–Haul Coherent Optical Fiber Communication Systems Using Optical Amplifiers", Journal of Lightwave Technology, vol. 9, No. 2, Feb. 1991, pp. 251–260.

*Primary Examiner*—Leslie Pascal
*Attorney, Agent, or Firm*—Foley & Lardner

[57] ABSTRACT

An optical transmission system of the present invention has a tributary station and a plurality of repeater stations. The tributary station supplies a transmission signal having a data signal and a control signal. Each of the repeater stations detects the control signal from the transmission signal, and controls its own amplification factor in accordance with the control signal.

4 Claims, 7 Drawing Sheets

OPTICAL TRANSMISSION SYSTEM

FIELD OF THE INVENTION

This invention relates to an optical transmission system, and more particularly, to an optical transmission system used for a long distance optical communication system such as a submarine optical fiber cable communication.

BACKGROUND OF THE INVENTION

A conventional optical transmission system includes tributary stations and a plurality of repeater stations. The repeater stations are connected in series with predetermined intervals between two of the tributary stations in series. In such an optical transmission system, a signal is transmitted from one tributary station through the plurality of repeater stations to the other tributary station.

Each of the repeater stations includes an amplifier for amplifying a received signal, a photodiode for detecting an output light to be transmitted to the next stage to provide a sampling signal, and a control circuit for controlling the amplifier in accordance with the sampling signal. In the control circuit, the sampling signal is compared with a predetermined reference value to obtain the difference value thereof, and a control signal corresponding to the difference value is supplied to the amplifier. In accordance with the control signal, the amplification ratio of the amplifier is controlled. Thus, the received signal is amplified and supplied to the next stage.

In the optical transmission system of multi-repeating type, spontaneous emission noises which occur in the repeater stations are accumulated during the transmission, which cause S/N (signal to noise) ratio of the transmission signal to be lowered.

This results in the increase of bit error ratio. In order to meet a predetermined level of the S/N ratio providing a predetermined level of the bit error ratio, it is required that an output power of each repeater station is set high. On the other hand, if the output power is set high, non-linear optical effect of optical fiber can not be negligible.

For this reason, an output power of each repeater station is set in a range determined by the minimum value meeting an S/N ratio and the maximum value dependent on the non-linear optical effect of optical fibers.

According to the conventional optical transmission system, however, an output power of each repeater station is difficult to be set in the range determined by the above maximum and minimum values, because characteristics of optical fibers, optical direct amplifiers, optical signals, etc. are different even at initial state of installation, and in accordance with the deterioration due to the elapse of time.

SUMMARY OF THE INVENTION

Accordingly, it is an object of the invention to provide an optical transmission system in which outputs of repeater stations can be remote-controlled.

It is a further object of the invention to provide an optical transmission system in which an optical power of each repeater station is well controlled to meet a predetermined range.

According to the invention, an optical transmission system includes:

a tributary station, comprising:

a first transmitter for transmitting a light data signal to a second transmitter; and a modulator for modulating said light data signal by a power control signal controlling a power of the light data signal; and a plurality of repeater stations provided in series between the first and second tributary stations, each of the repeater stations, comprising:

an optical amplifier for amplifying the light data signal by a predetermined amplification factor;

a demodulator for demodulating the light data signal modulated by the power control signal; and means for controlling the predetermined amplification factor dependent on the power control signal.

The other objects and features of the invention will become understood from the following description with reference to the accompanying drawings.

DESCRIPTION OF THE PREFERRED EMBODIMENTS

For better understanding of the background of the present invention, the basic principle of the conventional technology is first described hereinafter with reference to FIGS. 1 and 2.

Figure 1:
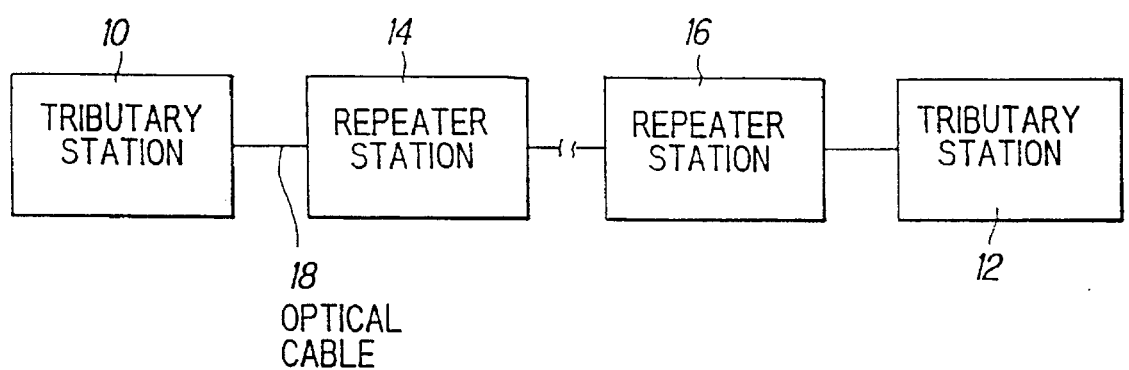
FIG. 1 is a block diagram showing a conventional optical transmission system.

FIG. 1 shows a conventional optical transmission system, which includes tributary stations 10 and 12 each having the same structure, and repeater stations 14 and 16 each having the same structure. These stations are connected in series by an optical fiber cable 18. In the optical transmission system, a transmission signal generated in the tributary station 10 is transmitted via the repeater stations 14 and 16 to the other tributary station 12.

Figure 2:
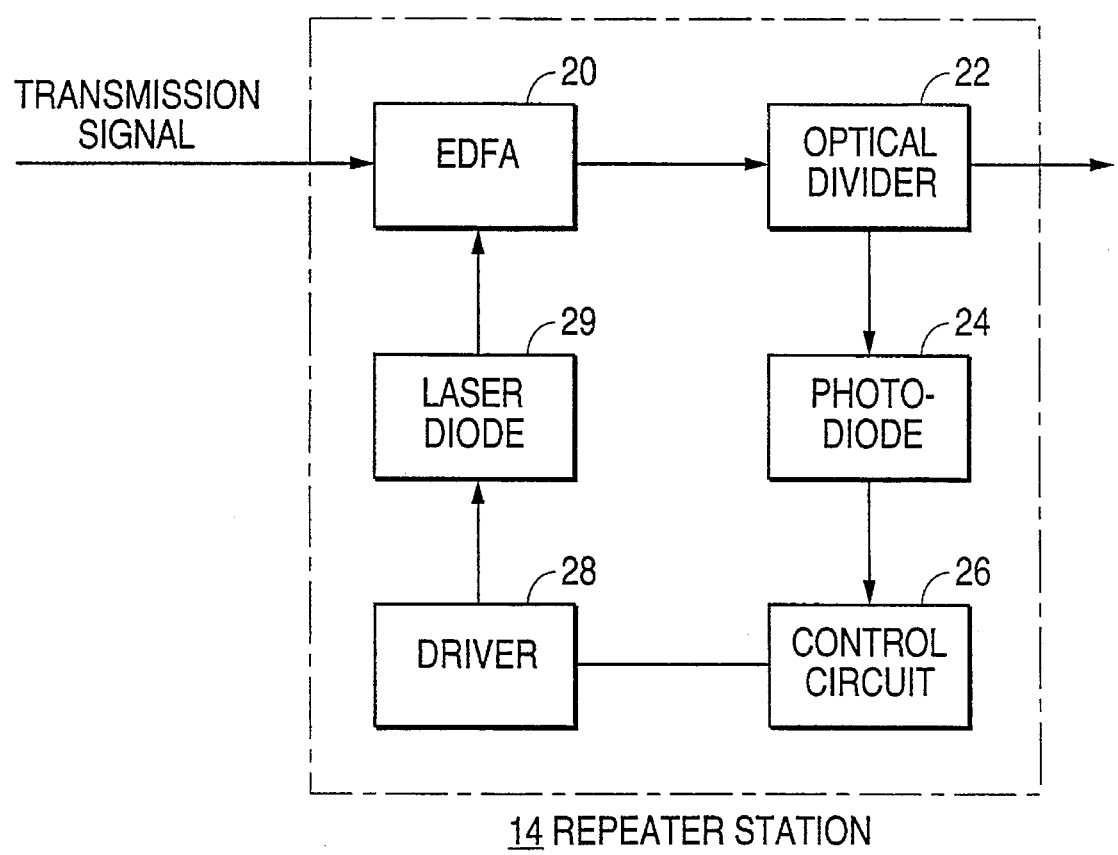
FIG. 2 is a block diagram showing a repeater station used in the conventional optical transmission system.

FIG. 2 shows the repeater station 14, which includes an EDFA (erbium-doped fiber amplifier) connected to the optical cable 18, an optical divider 22 connected to the EDFA 20, a photodiode 24 connected to the optical divider 22, a control circuit 26 connected to the photodiode 24, a driver 28 connected to the control circuit 26, and a laser diode 29 connected to the diver 28 and the EDFA 20.

In operation, when a signal is transmitted from the tributary station 10 to the repeater station 14, the signal is amplified by the EDFA 20 and supplied to the optical divider 22. The amplified signal is divided by the optical divider 22 into two light signals which are an output light signal and a sample light signal. The sample light signal is supplied to the photodiode 24, and is converted to an electric signal thereat. The electric signal is supplied to the control circuit 26. In accordance with the electric signal, a mean value of the output light is detected by the control circuit 26. Then, a control signal is generated in accordance with the mean value, and the control signal is supplied to the driver 28. In more detail, when the mean value is lower than a reference value, a laser diode excitation current-increasing control signal is supplied to the driver 28. On the other hand, when the mean value is higher than the reference value, a laser diode excitation current-decreasing control signal is supplied to the driver 28.

In response to the control signal, the driver 28 supplies an excitation current to the laser diode 29. In accordance with the excitation current, the laser diode 29 supplies a control light to the EDFA 20. An amplification factor of the EDFA 20 is controlled in accordance with the control light.

Figure 3:
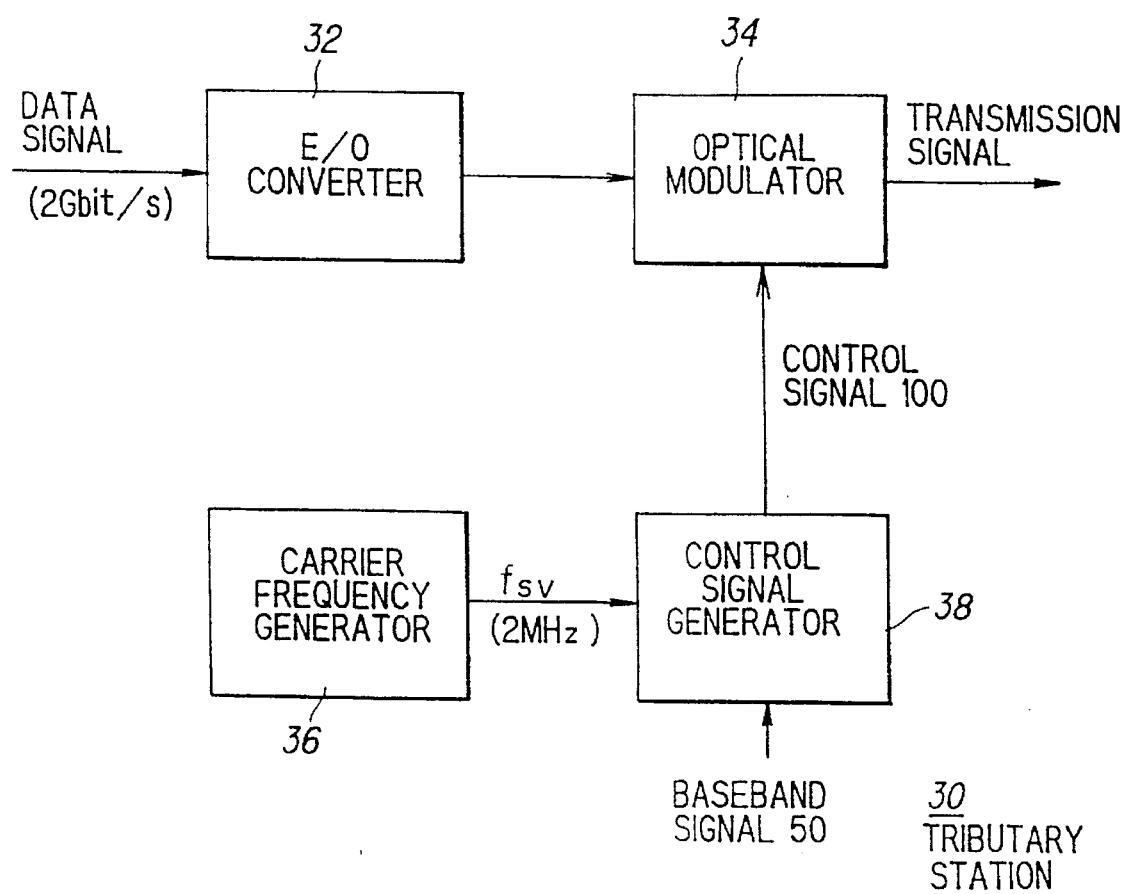
FIG. 3 is a block diagram showing a tributary station used in an optical transmission system of a first preferred embodiment according to the invention.

FIG. 3 shows a tributary station 30 for an optical transmission system of a first preferred embodiment according to the invention. The tributary station 30 includes an E/O (electrical-optical) converter 32 to which a data signal of 2 Gbit/s is supplied, an optical modulator 34 connected to the E/O converter 32, a carrier frequency generator 36, and a control signal generator 38 connected to the optical modulator 34. The optical modulator 34 is fabricated by forming a wave guide pattern and an electrode film on a LiNbO$_3$ substrate.

Figure 4:
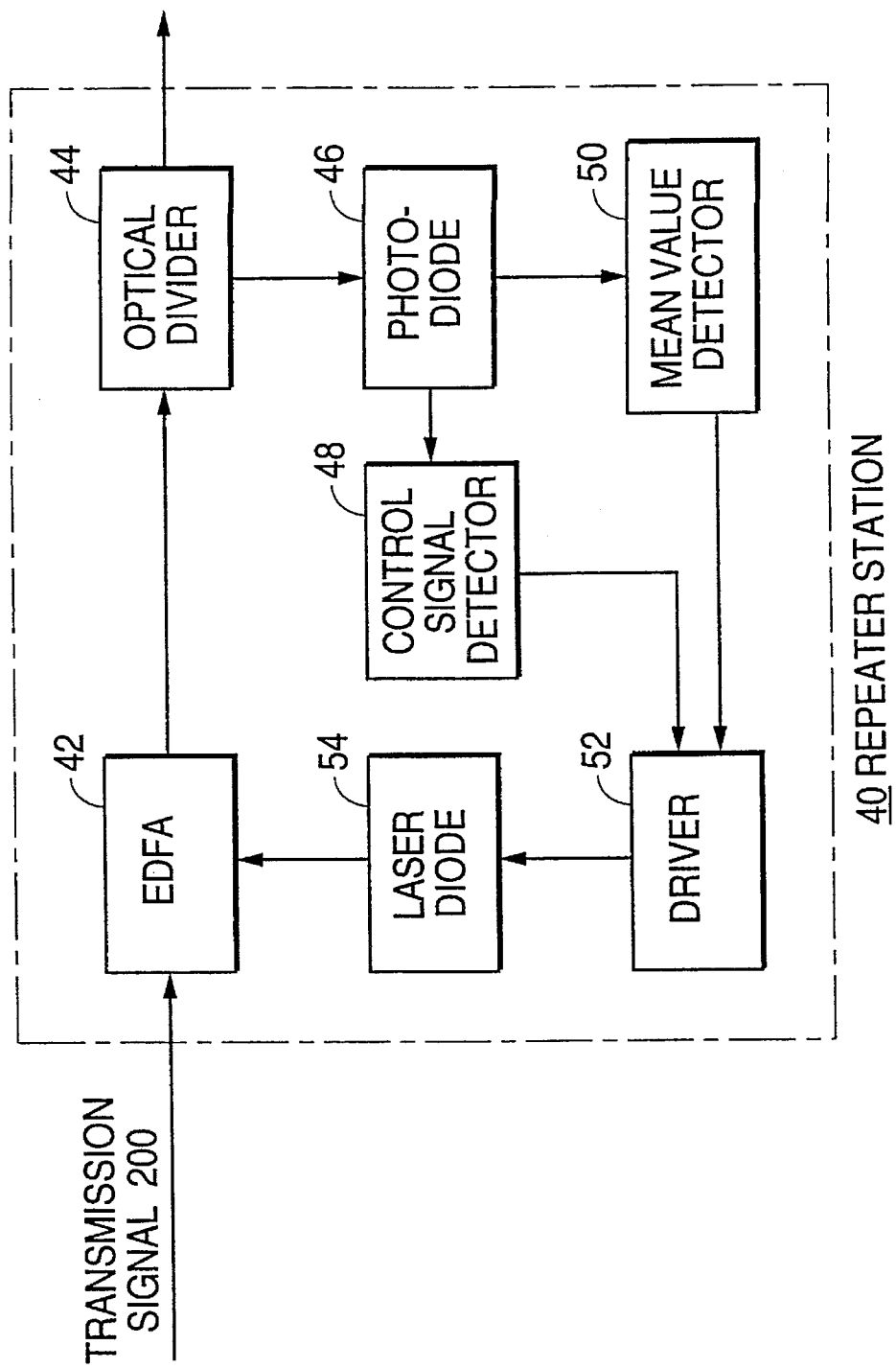
FIG. 4 is a block diagram showing a repeater station used in the first preferred embodiment.

FIG. 4 shows a repeater station 40 for the optical transmission system of the first preferred embodiment according to the invention. The repeater station 40 includes an EDFA (erbium-doped fiber amplifier) 42, an optical divider 44 connected to the EDFA 42, a photodiode 46 connected to the optical divider 44, a control signal detector 48 connected to the photodiode 46, a mean value detector 50 connected to the photodiode 46, a driver 52 connected to the control signal detector 48 and the mean value detector 50, and a laser diode 54 connected between the driver 52 and the EDFA 42.

Figure 5:
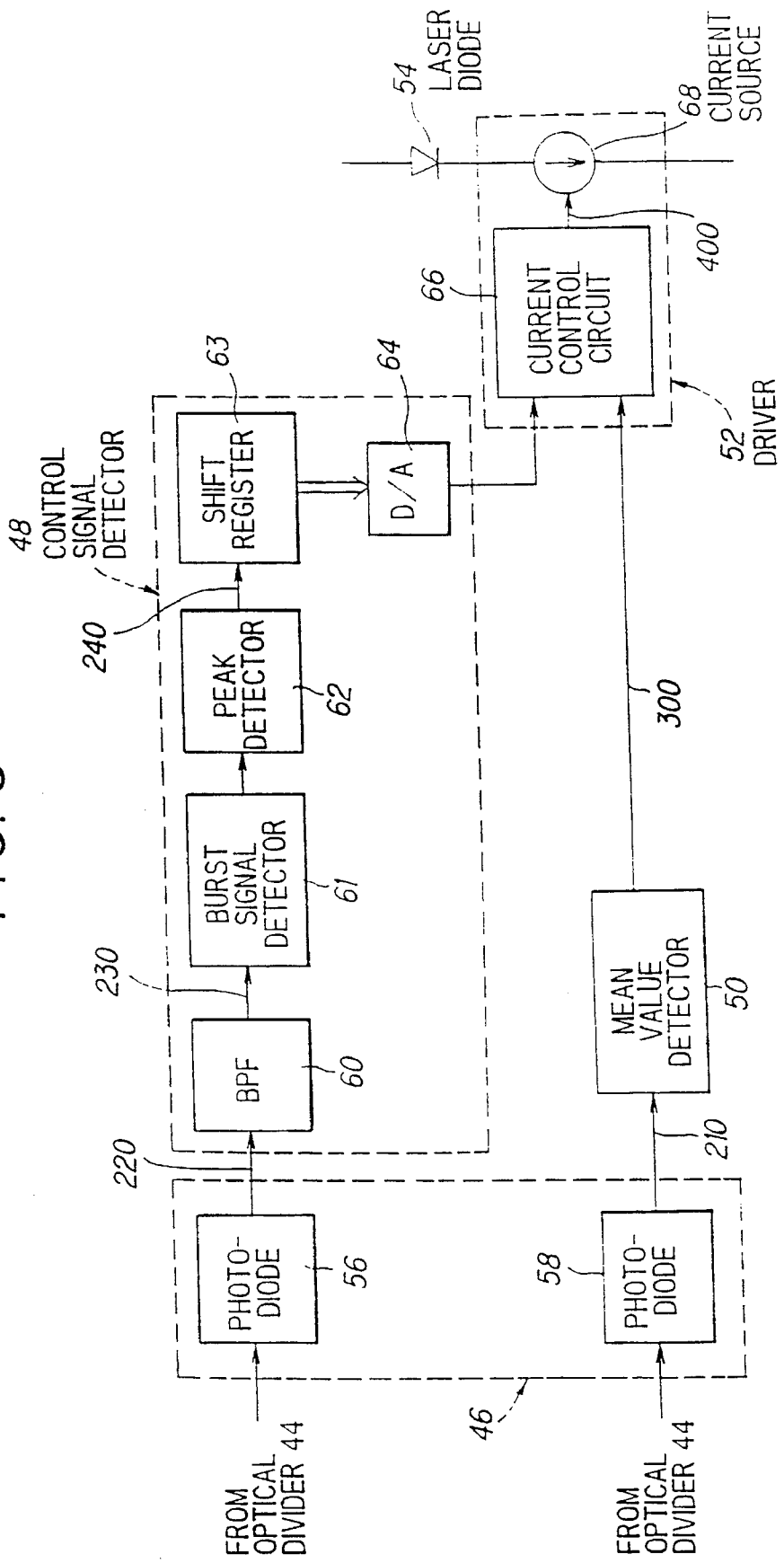
FIG. 5 is a block diagram showing detail of part of the repeater station shown in FIG. 4.

FIG. 5 shows a detail of the repeater station 40. The photodiode 46 is composed of two photodiodes 56 and 58. A single photodiode may be used to supplied electric signals to the detectors 48 and 50.

The control signal detector 48 includes a BPF (band-pass filter) 60 connected to the photodiode 56, a burst signal detector 61 connected to the BPF 60, a peak detector 62 connected to the burst signal detector 61, a shift register 63 connected to the peak detector 62, a D/A (digital-analog) converter 64 connected to the shift register 63 and the driver 52. The driver 52 includes a current control circuit 66 connected to the mean value detector 50 and the D/A converter 64, and a current source 68 connected to the current control circuit 66 and the laser diode 54.

Figure 6:
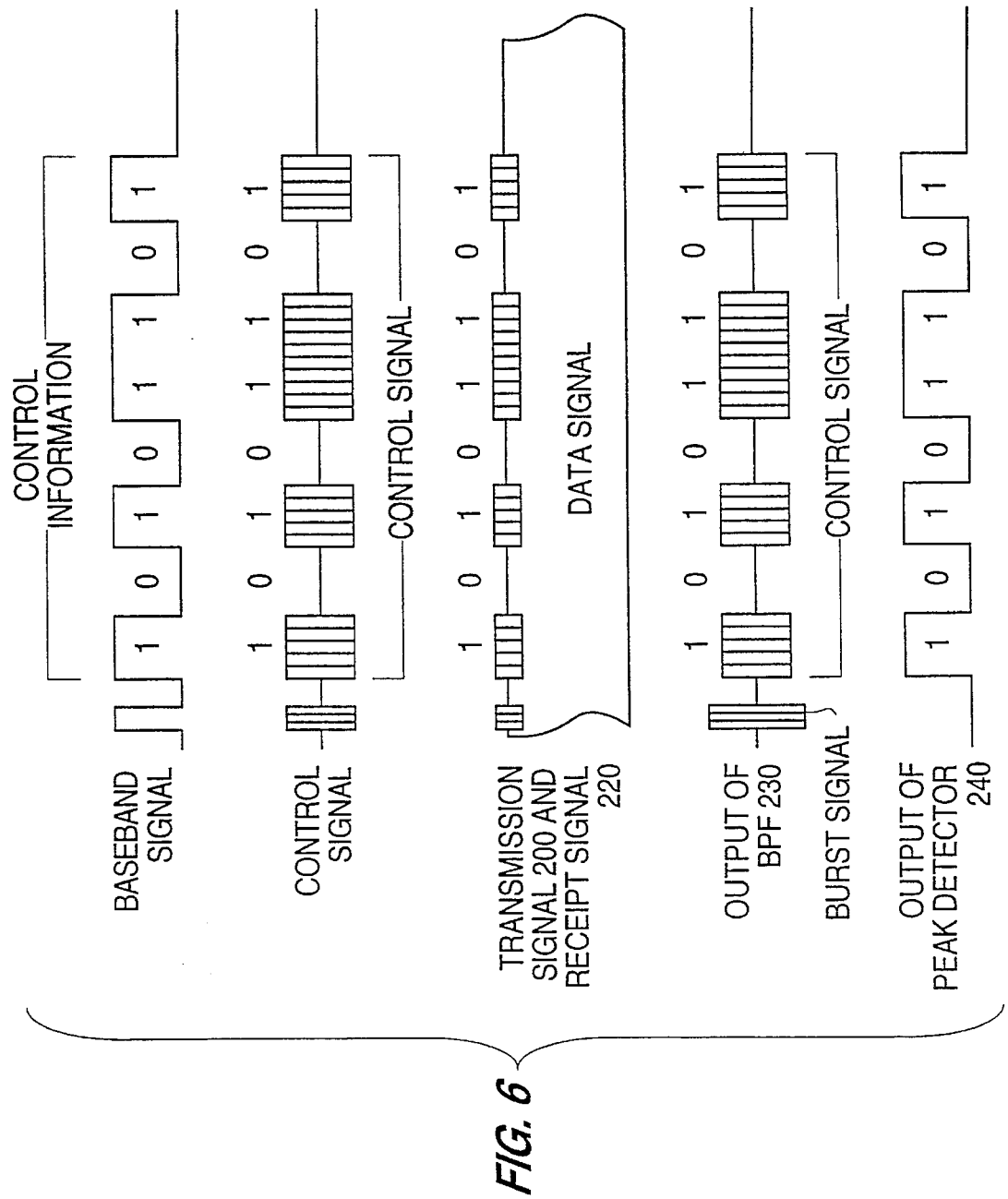
FIG. 6 is a timing chart showing operation of the first preferred embodiment.

Next, operation of the first preferred embodiment will be explained in conjunction with FIG. 6. When the data signal is supplied to the E/O converter 32, the signal is converted to an optical signal, and the optical data signal is supplied to the optical modulator 34. On the other hand, when a carrier signal (sine wave) having a frequency $f_{sv}$ of 2 MHz is supplied from the carrier frequency generator 36 to the control signal generator 38, the carrier signal is modulated in accordance with control information (base-band signal 50 for controlling an output power of the repeater station 40), which is of 8 bits "10101101", to provide a control signal 100 to be supplied to the optical modulator 34. In this step, the modulation degree is several % not affecting the data transmission via the repeater station 40.

In the optical modulator 34, the control signal 100 is applied to the electrode film of the optical modulator 34 to induce an electro-optical effect, so that the data signal supplied to the guide wave pattern is modulated.

The transmission signal 200 of the data signal thus modulated in amplitude by the control signal 100 is transmitted from the tributary station 30 to the repeater station 40 in which, the transmission signal 200 is amplified by the EDFA 42 and the amplified signal is supplied to the optical divider 44. The optical divider 44 divides the transmission signal, so that one is transmitted to the next repeater station and the other is supplied to the photodiode 46. In the photodiode 46, the transmission signal is converted to electric signals 210 and 220 by the photodiode 56 and 58, respectively.

The mean value detector 50 detects the mean value of the transmission signal in accordance with the electric signal 210 to provide a mean value signal 300 to be supplied to the current control circuit 66 of the driver 52.

On the other hand, when the signal 220 is supplied to the BPF 60 of the control signal detector 48, and a carrier frequency component thereof is passed through the BPF 60 to be supplied to the burst signal detector 61. Then, when the burst signal is detected in the burst signal detector 61, the control signal following the burst signal is supplied to the peak detector 62 to hold the peak of the control signal. Next, the control signal 240 of 8 bits is supplied from the peak detector 62 to the shift register 63 to store the 8 bits signal. After that, when the control signal is supplied to the D/A converter 64, and the signal is converted to an analog signal to reproduce the control information to be supplied to the current control circuit 66 of the driver 52.

The current control circuit 66 compares the mean value signal 300 to a predetermined reference signal, and generates a current control signal 400 in accordance with the result of the comparison and the control information supplied from the D/A converter of the control signal detector 48. In more detail, a current decreasing signal is generated when the mean value signal 300 is larger than the reference signal, and a current increasing signal is generated when the mean value signal 300 is smaller than the reference signal. Further, the control information supplied from the D/A converter 64 serves as controlling the increase of an excitation current of the laser didode 54 in proportion to a level thereof.

The current source 68 supplies the excitation current, a level of which is determined in accordance with the current control signal 400, to the laser diode 54. In response to the excitation current from the current source 68, a control light is supplied from the laser diode 54 to the EDFA 42. When the control light is supplied to the EDFA 42, an amplification factor of the EDFA 42 is adjusted in accordance with the control light.

As described in the first preferred embodiment, an output power of the transmitted light signal is detected in the mean value detector 50, and an output power control signal modulating the transmitting light signal is detected in the control signal detector 48. In accordance with a mean value of the output power, an excitation current of the laser diode 54 is increased and decreased dependent on the comparison thereof to a predetermined value. On the other hand, the output power control signal obtained by demodulating the transmitted light signal is used to increase the excitation current proportionally to a level of the output power control signal. This means that output power of each repeater station is remotely controlled from a tributary station.

Figure 7:
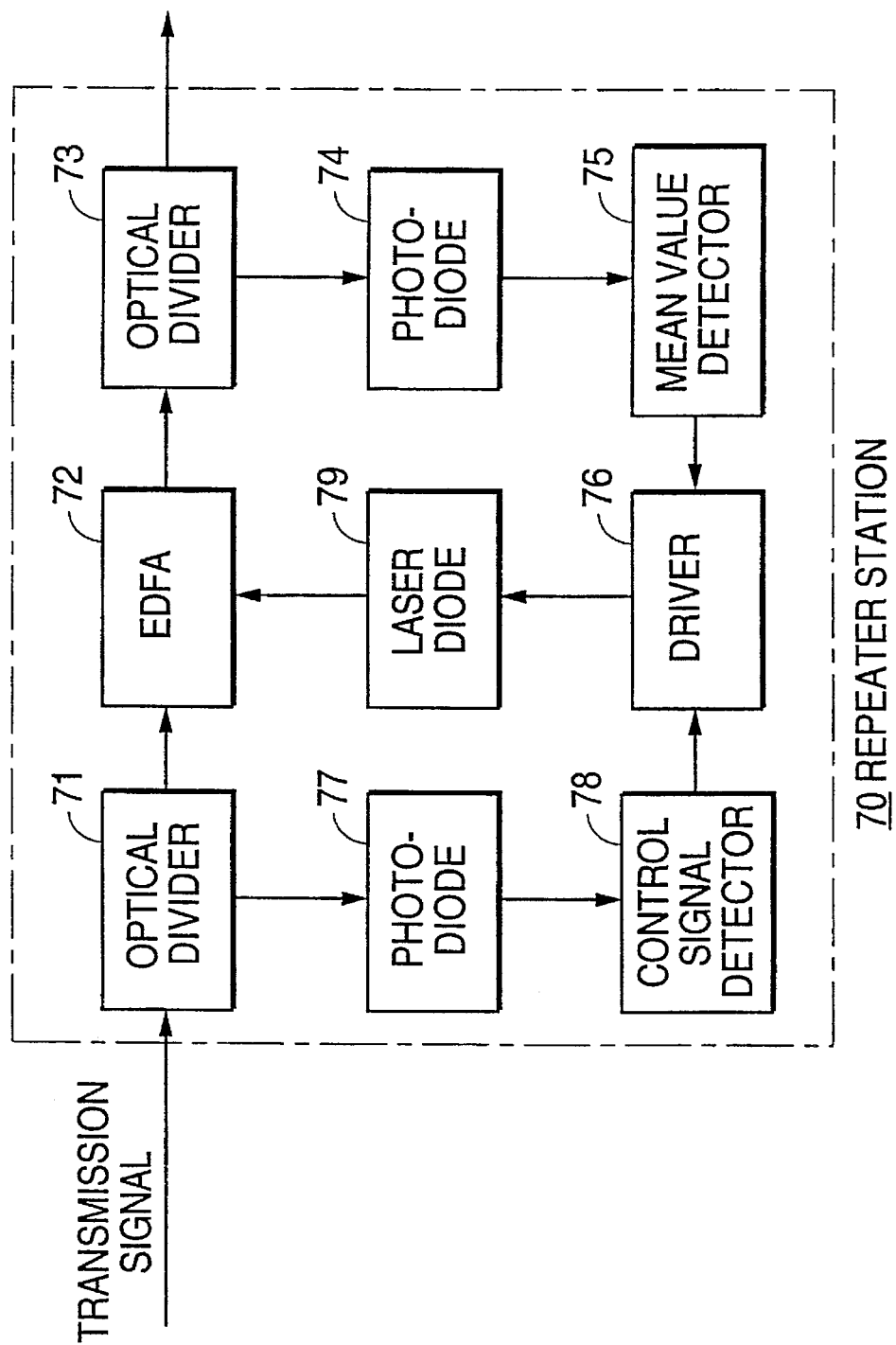
FIG. 7 is a block diagram showing a repeater station of used in an optical transmission system of a second preferred embodiment according to the invention.

FIG. 7 shows a repeater station 70 of a second preferred embodiment according to the invention. The repeater station 70 includes an optical divider 71 to which a transmission signal is supplied, an EDFA circuit 72 connected to the optical divider 71, an optical divider 73 connected to the EDFA 72, a photodiode 74 connected to the optical divider 73, a mean value detector 75 connected to the photodiode 74, a driver 76 connected to the mean value detector 75, a photodiode 77 connected to the optical divider 71, a control signal detector 78 connected to the photodiode 77 and the driver 76, and a laser diode 79 connected between the driver 76 and the EDFA circuit 72.

In this embodiment, an output power control signal supplied from a tributary station is detected at the front stage of the EDFA 72. The other structure and operation correspond to those of the first preferred embodiment shown in FIG. 4, so that the explanation is omitted.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching herein set forth.

For example, in the tributary station 30, the data signal may be modulated not only by amplitude but also by frequency or phase. Further, the output power control signal 100 may be transmitted by a time-division multiplex method. That is, an 8 bits region is formed in a frame of the data signal, and the control signal 100 is inserted in the 8 bits region.

What is claimed is:

1. An optical transmission system, comprising:

first and second tributary stations, the first tributary station comprising:

a transmitter for transmitting a light data signal; and a modulator for modulating an amplitude of said light data signal by a power control signal of plural bits;

a plurality of repeater stations provided in series between said first and second tributary stations, each of said repeater stations comprising:

an optical amplifier for amplifying said light data signal by a predetermined amplification factor;

a demodulator including an O/E converter for converting said amplified light data signal to provide a first electric data signal modulated by an electric power control signal, and means for providing said electric power control signal by detecting a peak value of said first electric data signal;

means for receiving the amplified light data signal from said optical amplifier and detecting a power of said amplified light data signal including an O/E converter for converting said light data signal modulated by said power control signal to provide a second electric data signal modulated by an electric power control signal, and means for calculating a mean value of said second electric data signal;

means for comparing said mean value to a reference signal to provide a difference signal; and control means including a laser diode for controlling said amplification factor dependent on a light output power thereof to be supplied to said amplifier, and means for controlling an excitation current of said laser diode dependent on said electric power control signal and said difference signal.

2. An optical transmission system, comprising:

a tributary station for transmitting a transmission signal which includes a data Signal and a control signal;

a plurality of repeater stations for relaying said transmission signal, each of said repeater stations comprising a first detector for detecting said control signal from said transmission signal, an amplifier for amplifying said transmission signal, and a first control circuit for controlling said amplifier in accordance with an output signal of said first detector;

wherein each of said repeater stations further comprises a second detector for detecting an output signal of said amplifier, and a second control circuit for controlling said amplifier in accordance with an output signal of said second detector.

3. An optical transmission system, according to claim 2, wherein:

said first detector detects said control signal from said output signal of said amplifier.

4. An optical transmission system, according to claim 2, wherein:

said first detector detects said control signal from an input signal transmitted to the repeater station.

* * * * *